United States Patent
Farkonas et al.

[11] Patent Number: 5,230,651
[45] Date of Patent: Jul. 27, 1993

[54] METHOD AND APPARATUS FOR SEVERING SHIRRED TUBULAR FOOD CASING, AND ARTICLE

[75] Inventors: John Farkonas, Glenview; Michael P. Kazaitis, Chicago, both of Ill.

[73] Assignee: Viskase Corporation, Chicago, Ill.

[21] Appl. No.: 724,058

[22] Filed: Jul. 1, 1991

[51] Int. Cl.$^5$ .............................................. A22C 13/00
[52] U.S. Cl. ...................................................... 452/29
[58] Field of Search ................. 452/29, 21, 30, 22, 452/24

[56] References Cited

U.S. PATENT DOCUMENTS

| | | | |
|---|---|---|---|
| 3,158,896 | 12/1964 | Marbach | 17/45 |
| 3,564,647 | 2/1971 | Matecki | 452/29 |
| 3,936,909 | 2/1976 | Carter | 17/42 |
| 4,052,770 | 10/1977 | Asquith | 17/42 |
| 4,084,466 | 4/1978 | Frank | 83/193 |
| 4,153,975 | 5/1979 | Ziolko | 17/45 |
| 4,295,247 | 10/1981 | Trimble et al. | 17/1 R |
| 4,307,488 | 12/1981 | Lofland et al. | 17/42 |
| 4,547,932 | 10/1985 | Romeike et al. | 17/45 |
| 4,885,821 | 12/1989 | Farkonas | 17/49 |
| 5,056,293 | 10/1991 | Richards et al. | 452/29 |

Primary Examiner—Willis Little
Attorney, Agent, or Firm—Roger Aceto

[57] ABSTRACT

Severing a shirred stick of sausage casing from casing feed stock joined to the stick is accomplished by cutting a longitudinal slit in the feed stock adjacent the shirred stick. A tear is initiated at some point spaced around the casing from the slit and the tear is allowed to propagate in opposite directions from that point around the casing and into the slit. The result is that the severed ends of casing are each free of loose shards of casing.

18 Claims, 4 Drawing Sheets

METHOD AND APPARATUS FOR SEVERING SHIRRED TUBULAR FOOD CASING, AND ARTICLE

TECHNICAL FIELD

The present invention relates to the production of shirred casing sticks and more particularly to a method and apparatus for severing a shirred stick from the casing feed stock, and a shirred casing article.

BACKGROUND OF THE INVENTION

Food casings of regenerated cellulose are widely used for the production of various stuffed food products. Cellulosic casing for production of large diameter sausages such as bologna and the like generally are reinforced with a fibrous web. The present invention, however, is concerned primarily with thin walled unreinforced cellulosic casing as may be used in the production of small diameter sausages such as frankfurters and the like.

For convenience of handling, food casings which may be 20 to 50 meters or more in length are shirred and preferably compressed to produce what commonly are referred to as "shirred casing sticks". Such casing sticks are hollow cylinders about 20 to 60 centimeters in length. Shirring machines for producing these shirred sticks are well known in the art and are disclosed in U.S. Pat. Nos. 2,983,949 and 2,984,574 among others. Shirring and related technology also are described in the Noyes Data publication "Sausage Casing Technology" by Karmas (1974) at pages 259–347.

Cellulosic casing for the shirring operation is supplied in reels. The flat casing feed stock, drawn from a reel, is fed into a shirring machine where it is inflated with low pressure gas, usually air. The inflated casing is moved onto and along a mandrel and through an array of shirring rolls. In one form of shirring, the shirring rolls gather the casing about the mandrel into generally conical pleats nested one tightly against another. The inner folds of the pleats are formed against the mandrel and define the surface of an axial bore through the stick.

When a preselected shirred length has been attained, it is severed from the unshirred feed stock and moved longitudinally away from the array of shirring rolls for further processing. Such further processing may include, for example, a compaction operation where the shirred length is reduced and an operation where a closure is formed and inserted to stop or plug the bore at one end of the casing thereby forming a "closed" end. The other end of the casing is left open to permit mounting of the shirred stick onto a stuffing horn.

Severing of the last shirred end of the stick from the reel of casing feed stock has been accomplished both manually and by automatic means. Severing generally involves a tearing action. For example, U.S. Pat. No. 4,885,821 discloses a severing method and apparatus wherein a knife edge closes against the end face of a shirred stick. The knife edge pushes on the shirred stick while the feed stock is held. This tenses the feed stock casing so it tears along the knife edge where the feed stock joins the shirred stick.

However, tearing the casing, even along a knife edge, often results in one or more so called "shards" of casing attached to one or both the severed ends. A shard is produced when the ends of a tear or tears propagating around the casing do not meet but instead run past one another so a small neck of casing lies between the ends of the tear. Moreover, if tears initiate at several points along the knife edge, a plurality of shards may be produced.

Shards at the severed ends of the casing are objectionable because they may separate from the casing and become incorporated into the food product being stuffed into the casing. This is especially the case when using the casing for stuffing frankfurters. After a shirred stick is stuffed with a frankfurter emulsion, it is common for the operator to squeeze out or "milk" emulsion from the ends of the casing so the ends can be tied off. Shards at the end of the casing can rip free responsive to this procedure. Since the emulsion squeezed out of the casing is recovered and recycled, any shard of casing ripped off by the procedure may become incorporated into the emulsion supply.

Accordingly, it is most desirable to sever the shirred stick from casing feed stock in a manner which eliminates the formation of shards on the severed ends of casing.

OBJECTS OF THE INVENTION

One object of the present invention is to provide an improved method and apparatus for severing a length of shirred casing from the feed stock of unshirred casing.

Another object of the present invention is to provide a method and apparatus for severing a length of shirred casing from the casing feed stock which eliminates the formation of shards on the severed ends of casing.

A still further object is to provide a shirred stick wherein the severed ends of the casing at both the first-shirred and last-shirred ends of the stick are free of shards which may rip free of the casing during an emulsion stripping operation.

SUMMARY OF THE INVENTION

In one aspect, the invention is characterized by a method of severing a stick of shirred casing from a length of feed stock casing joined to the stick including the steps of cutting a longitudinal slit in the feed stock casing, creating a localized stress concentration in the feed stock casing at a location spaced around the feed stock from the slit and then propagating a tear in the feed stock casing from that location and around the casing to the slit.

In another aspect, the invention is characterized by an apparatus for severing a stick of shirred casing from a length of feed stock casing joined to the stick including a means for cutting a longitudinal slit in the feed stock casing, means for creating a localized stress concentration in the feed stock at a location around the casing from the slit and means for creating a sufficient tension on the casing to initiate and propagate a tear from that location and around the casing and into the slit.

The resulting casing article is a shirred stick of casing having an end composed of a section of casing which includes a transverse terminal end and the section having a longitudinal slit extending inward from the terminal end.

DETAILED DESCRIPTION OF THE INVENTION

Figure 1:
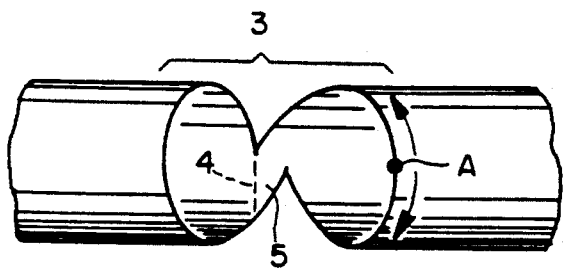
FIGS. 1–3 illustrate the result of a prior art method for severing casing.
Figure 2:
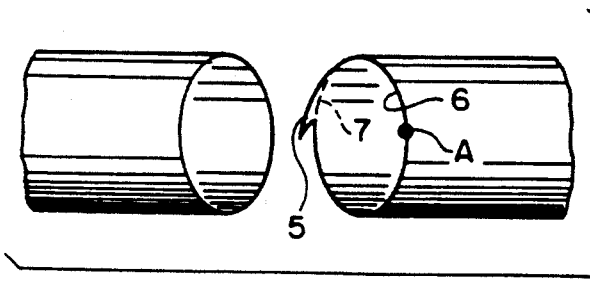
Figure 3:
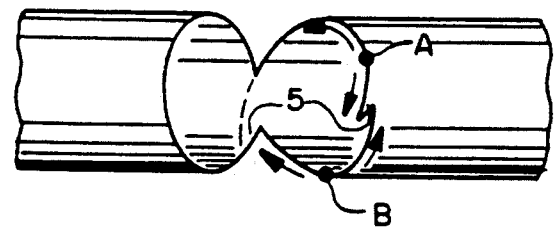

FIGS. 1-3 illustrate a prior art severing method resulting in the formation of a shard on the severed end of casing. FIG. 1 shows a casing section 3 under tension so that a tear, which initiates at some point or location "A" of stress concentration on the casing, propagates in opposite directions around the casing. If the ends of the tear propagation fail to meet in the same transverse plane, they overlap and run past one another as shown in FIG. 1. Eventually one tear will run into the other as shown by dotted line 4 and cause a shard 5 to form on one of the severed ends.

FIG. 2 illustrates a single shard 5 on a transversely severed casing end 6. Because the ends of the tear propagating from point A have overlapped, the shard 5 is loose on the end of the casing. It should be appreciated that pulling the shard longitudinally from the casing end, as would occur during the stripping of the food emulsion from the casing, may cause the portion of the tear to propagate along a line, shown as dotted line 7, and into the severed casing end 6 so the shard is ripped free.

If tears initiate at a plurality of points A, B, etc. around the casing as shown in FIG. 3, then several shards 5 may be formed. This increases the likelihood that a shard will rip free and become incorporated into the emulsion stripped from the casing.

Figure 4:
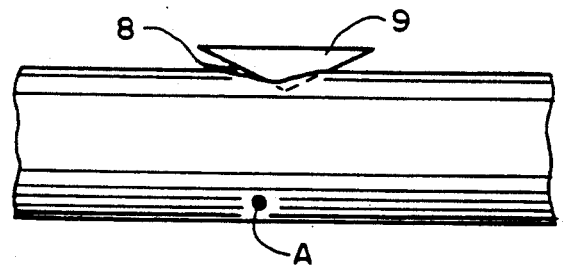
FIGS. 4–6 illustrate in schematic fashion the method steps of the present invention.
Figure 5:
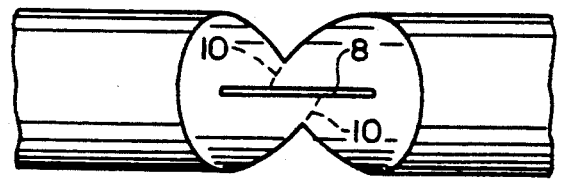

FIGS. 4-5 illustrate the steps of severing the casing according to the method of the present invention to avoid the formation of a shard.

As shown in FIG. 4, a longitudinal slit 8 is cut in the casing. The longitudinal slit can be made by a knife 9 as shown, or by any other suitable means such as a laser or rotary knife. Around the casing, at a point or location, "A", preferably opposite the slit, a localized stress concentration is created to initiate a tear. A localized stress concentration to initiate the tear may be facilitated by the use of a member such as a peg or pin (not shown) which presses against the casing at point "A". In this case, the initiation of the tear is substantially contemporaneous with the penetration or puncturing of the casing by the member. The tear also can be initiated by piercing the casing with a second knife (not shown) which is transversely oriented with respect to the longitudinal axis of the casing. In this case the ends of the transverse slit produced by the second knife are the locations of stress concentration from which a tear propagates.

With the casing under tension, a tear will propagate from point A in opposite directions around the casing. Each end of the tear eventually will run into the slit as shown by dotted lines 10 in FIG. 5. Since the tear runs into the longitudinal slit 8, the ends of the tear cannot overlap and run past one another to produce the situation shown in FIGS. 1-3. Instead, the casing severs when the tear propagates into the longitudinal slit to produce the transversely severed ends 11a, 11b shown in FIG. 6. A loose shard as shown in FIG. 2 is not produced and instead, the severed ends 11a, 11b each will have a tail 13a, 13b respectively defined in part by the portion of the longitudinal slit 8 which extends inwardly from each severed end. Moreover, since the slit 8 is longitudinal, pulling longitudinally on either casing end 11 and tail 13, as would occur during stripping, should not cause casing tails 13a, b adjacent the slit to rip free.

The slit 8 should be long enough to accommodate any overlap or misalignment of the ends of the tear as the tear propagates around the casing. Also, it is preferred that the tear propagates about the same length in opposite directions around the casing. Generally, except for certain shirring techniques as described hereinbelow, this means that the tear should initiate about 180° from the slit. Initiation of the tear can be made closer to the slit but this means that one side of the tear must propagate farther than the other so the resulting tails 13a, b could be relatively long. If the tear is initiated too close, the length of the tear propagation may permit the tear to run out to such an extent that it does not intersect the slit. Accordingly, creating a stress concentration to initiate the tear close to the slit may require an excessive slit length to be effective.

Figure 7:
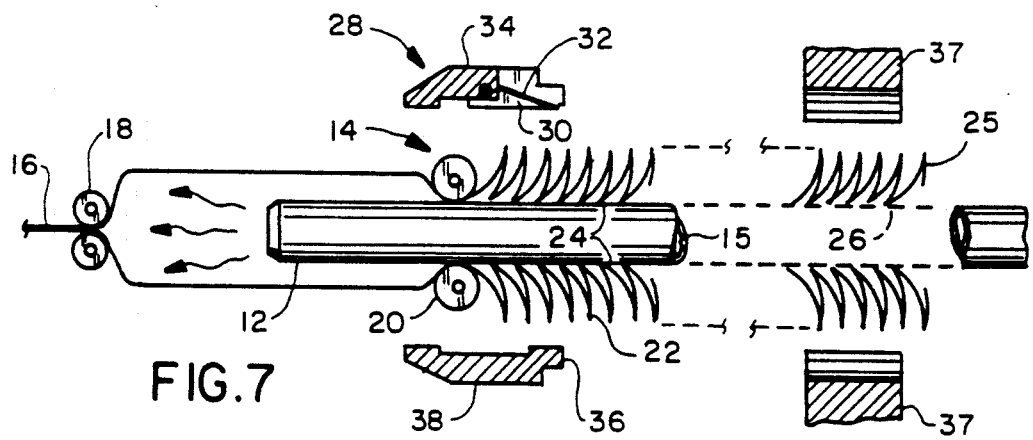
FIGS. 7 and 8 show in schematic fashion, components of a shirring machine equipped to sever the casing in a manner according to the method of the present invention.

FIG. 7 shows several elements of a conventional shirring machine incorporating components for severing the casing according to the present invention. The shirring machine itself is conventional and includes a mandrel 12 and a shirring head 14. It should be appreciated that the shirring machine can be either of the two types in general commercial use including a so-called "floating mandrel machine" of the type generally described in U.S. Pat. No. 3,766,603 or a "withdrawing mandrel" machine as generally described in U.S. Pat. No. 2,583,654.

Flattened feed stock casing 16 is drawn from a supply reel (not shown) and is fed onto the mandrel through the nip of driven feed rolls 18. As the casing passes onto the mandrel, it is inflated by air issuing from an axial passage 15 in the mandrel.

Lubricants and/or moisture or other treatments incorporated into this air stream may be applied to the casing inner surface as is well known in the art. The inflated casing passes along the mandrel and moves into the shirring head 14. The shirring head defines a shirring zone in which the inflated casing is gathered or shirred into pleats about the mandrel 12 to form a shirred stick 22 which exits from the shirring zone. The innerfolds 24 of the pleats are formed against the mandrel and define a longitudinal bore 26 through the shirred stick. The shirring head 14 may comprise any of the known shirring means as described, for example, in U.S. Pat. Nos. 3,461,484, 4,185,358, 4,370,780 or 4,374,447 among others. For purposes of illustration, the shirring head 14 is shown as comprising a plurality of toothed shirring rolls 20, usually three in number of a general type which is described in U.S. Pat. No. 3,461,484.

It should be appreciated that the shirring proceeds in conjunction with conventional and known shirring techniques including the application of lubricants to the external surface of the casing and in conjunction with known shirred casing holdback means (not shown). This holdback means retards the advance of the shirred pleats along the mandrel in order to provide a substantially regular pleat formation wherein the pleats are laid tightly one against another. In a preferred embodiment the shirring rolls lay the pleats at an angle of about 30° with respect to the longitudinal axis of the mandrel so that the overall shirred length is somewhat like a stack of interconnected nesting cones. In a conventional shirring operation, the outside diameter of the shirred stick 22 is larger than the inflated diameter of casing feed stock 16.

After a desired length of casing has been shirred, the shirred stick must be separated from the feed stock. Once the shirred stick is separated, it may be subject to further operations (not shown) such as a compaction step to further reduce its length and a step to provide one end of the stick, e.g., the first shirred end 25, with a closure means.

For purposes of separating the shirred stick 22 from the feed stock 16, FIG. 7 shows a severing means generally indicated at 28 positioned adjacent the shirring head 14 on the exit or shirred stick side of the shirring zone.

One component of the severing means according to the present invention is a knife blade 30 carried by a radially movable jaw 34. The blade is oriented longitudinally with respect to the casing and the edge 32 away from mandrel 12 is the knife cutting edge. A second component includes a means for raising stress such as a peg or pin 36. The pin 36 is located generally on the opposite side of the mandrel from knife 30 and is carried by a radially movable jaw 38. It should be appreciated that the jaws 34, 38 are movable radially from an open position as shown in FIG. 7 to a closed position which locates the knife blade 30 and pin 36 close to the surface of mandrel 12.

In addition to radial movement, the jaws 34, 38 are mounted in a fixture (not shown) arranged for moving the jaws longitudinally relative to the mandrel 12. Completing the structure for purposes of this description is a split ring, portions of which are shown at 37. The ring is closable about the shirred stick 22 for purposes set out hereinbelow.

In operation, the shirring of the inflated feed stock 16 as illustrated in FIG. 7 progresses until the desired length of shirred stick accumulates on the mandrel. The feeding and shirring operations stop and several events occur in rapid sequence.

Figure 8:
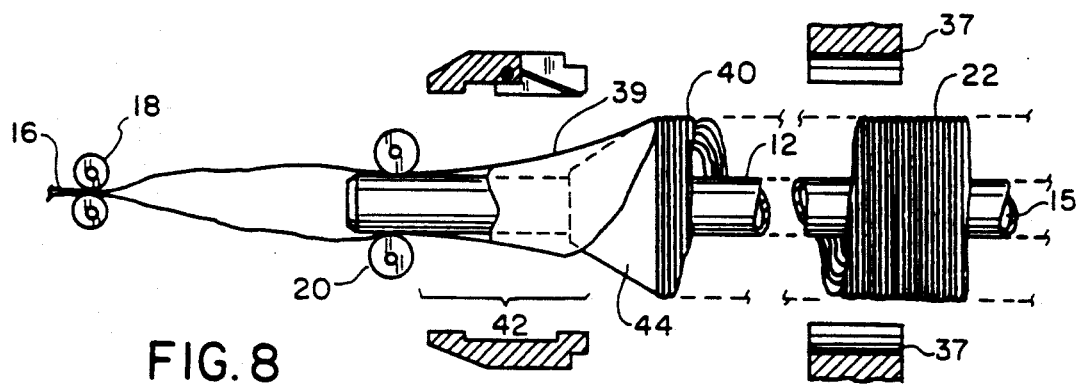

As illustrated in FIG. 8, the inflating air is shut-off so the casing can deflate and the mandrel 12 is displaced several inches in the shirring direction (longitudinally to the right as shown in the figures). The longitudinal displacement of mandrel 12 also carries the shirred stick 22 away from the shirring rolls 20 to provide a space 42 between the shirring rolls 20 and the end face 44 of the shirred stick. The casing feed stock 16 is prevented from moving in the shirring direction as the stick moves away from the shirring roll so that a length of casing 39 peels or deshirrs from the pleats at the last-shirred end portion 40 of the stick. Preventing the feed stock from moving in the shirring direction can be accomplished by braking the feed stock reel or by clamping the feed stock to the mandrel. Preferably, it is accomplished by holding the feed stock at the nip provided by the stopped feed rolls 18. Thus, the longitudinal movement of the mandrel while the feed stock is held at the nip of driven feed rolls 18 not only provides a clearance space 42 between the shirring rolls 20 and the last-shirred end portion 40, but also exposes, in the clearance space 42, a section of casing 39 which is not shirred.

Providing a section of casing 39 which is not shirred also can be accomplished by rotating the feed rolls 18 to provide slack casing between the feed rolls and shirring head 14. Now, when the mandrel is displaced longitudinally to the right to the FIG. 8 position, this slack casing is pulled through the shirring head and forms the casing section 39.

In any event, the exposed section of casing 39 is feed stock casing which extends from the shirring rolls 20 and merges into the shirred pleats defining the last-shirred end face 44 of the stick.

The purpose of providing the clearance space 42 is to expose the last-shirred end face 44 of the stick so the severing means 28 can contact and press directly against the end face. Exposure of the end face 44 also can be achieved by translating the shirring rolls 20 forward (to the left as viewed in the figures) or by opening them radially.

After the mandrel is displaced longitudinally, the jaws 34, 38 close radially towards the mandrel. At the closed position, as best seen in the enlarged view of FIG. 9, the pin 36 and the point 33 of knife 30 are located close to the surface of mandrel 12 and just forward of the stick end face 44 adjacent the juncture of the feed stock and the shirred stick. Since the inflating air is shut-off, the portion of unshirred casing 39 immediately adjacent the end face 44 is free to collapse down against both the end face and the mandrel 12 when the jaws 34, 38 close.

If the casing is not deflated or the air pressure reduced prior to closing the jaws, the pressure exerted by the inflating air against the end face 44 of the stick when the jaws close may push the stick along the mandrel. In the alternative, an exterior restraint against the stick can be used to prevent premature stick movement.

After the jaws close, the mandrel returns to its start position which seats the end face 44 against pin 36 and locates it adjacent the knife point 33. The shirred stick 22 is not seized on the mandrel so the mandrel moves relative to the stick after the end face 44 is seated against the closed jaws.

Next, the split ring 37 (FIG. 8) closes about the outside surface of the shirred stick and a drive means (not shown) is operated to move the closed jaws 34, 38 longitudinally in the shirring direction to move the stick 22 along the mandrel 12 and away from the shirring head 14.

As noted hereinabove, the inside diameter of split ring 37 is slightly smaller than the outside diameter of stick 22. Accordingly, the closed split ring will resist, but not prevent, the movement of the stick by the closed jaws. It should be appreciated that closing the split ring 37 about the stick creates a drag to resist the movement of the shirred stick which, in turn, keeps the end face 44 of the stick seated tightly against pin 36 as the closed jaws 34, 38 move to the right as viewed in the figures.

Figure 10:
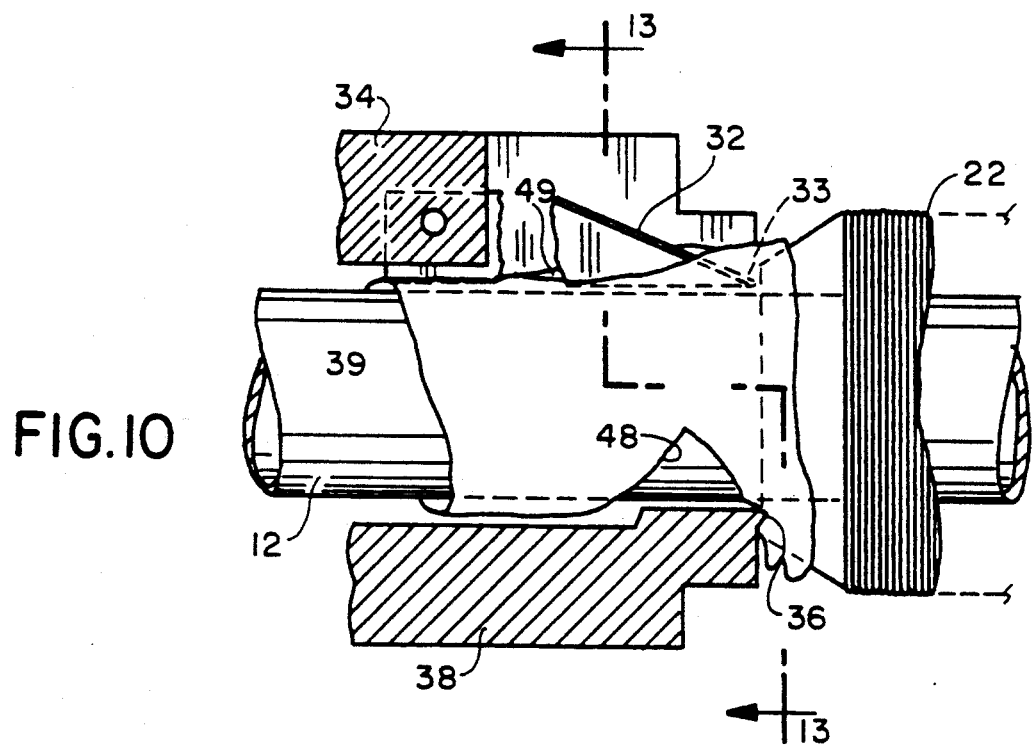
FIG. 10 is a view similar to FIG. 9 on a slightly larger scale and with portions removed for clarity to illustrate the position of components during the severing of the casing according to the method of the present invention.
Figure 11:
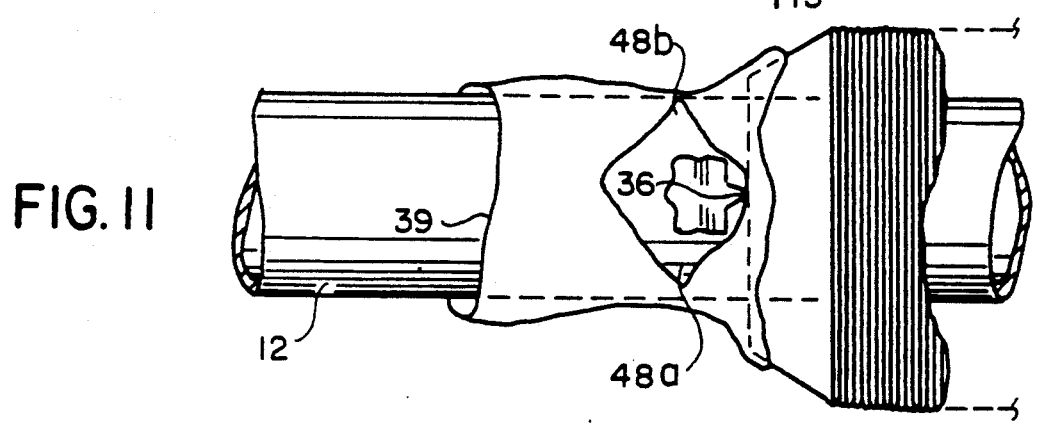
FIGS. 11 and 12 are bottom and top plan views respectively of FIG. 10.
Figure 12:
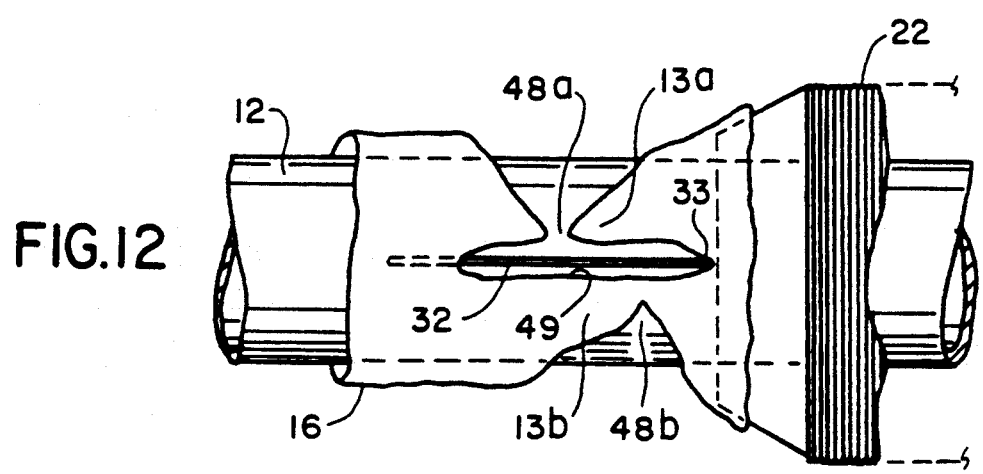

On one hand, the nip at the feed rolls 18 holds and prevents the movement of the feed stock casing 16 in the shirring direction as the stick moves. On the other hand, the pressing engagement of the pin 36 against the end face 44 of the stick acts to hold the casing against the end face. The result, as the stick is pushed in the shirring direction, is that the casing length 39 is put into tension. The tension of the casing across the pin 36 creates a single stress concentration causing a single tear 48 to initiate in the casing at this point (FIGS. 10 and 11). Since the pin creates only one stress concentration, only the single tear 48 is initiated and it rapidly propagates from the pin in opposite directions around the casing. Also, as the casing section 39 is put into tension, it draws against the knife point 33 which pierces the casing. The casing rides up and along the knife edge 32 so that a longitudinal slit 49 is cut into the casing (FIGS. 10 and 12). Casing 39 is kept in tension as the shirred casing stick is pushed to the right as viewed in the figures so casing draws along the knife edge 32 and the slit 49 elongates while the tear 48 continues to propagate around the casing. Eventually the opposite ends 48a, 48b of the tear propagate into the slit 49, as shown in FIG. 12, to completely sever the casing feed stock 16 from the shirred stick 22.

Figure 6:
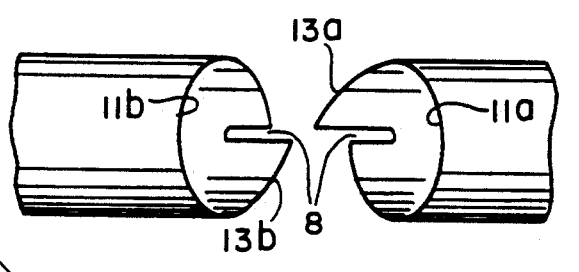

FIG. 12 illustrates the propagation of the tear into slit. In this respect, one end 48a of the tear has propagated into the slit 49 whereas the other end 48b is just about to enter the slit. Since the two tear ends 48a, 48b are slightly off set one from the other, the result (without the presence of slit 49) is that the two ends would run past each other and produce a shard (as demonstrated in FIGS. 1-2) when separation occurred. However, in the present invention, the tear ends 48a, 48b enter the longitudinally oriented slit 49 so a shard is not formed. Instead the severed ends will appear as shown in FIGS. 6 and 12. In this respect, as shown in FIG. 12, each severed end will retain a portion of the longitudinal slit 49. In addition, if the ends of the tear propagated around the casing do not meet in the same transverse plane, each severed end will have a tail 13a, 13b extending from the transverse plane of the severed end. Each portion 13 will be defined by a portion of a longitudinal slit 49, and by the ends of the tear 48 which have propagated into the slit. Thus, slit 49 has prevented the ends of the tear 48a, 48b from running past each other and this eliminates the conditions (shown in FIG. 1 and 2) necessary for the production of a shard. Since the slit 49 is oriented in a longitudinal direction, pulling either casing portion 13 longitudinally (as may occur during stripping) should not cause either portion 13a or 13b to rip free of the casing.

FIGS. 4-6 illustrate a preferred sequence to accommodate the propagation of a single tear around the casing in a manner which eliminates the production of one or more shards on the severed ends of the casing. A similar result may be accomplished by providing two (or more) longitudinal slits 8 spaced around the casing to create at least two sections and then initiating a tear propagation from a single point in each section between each pair of slits. Since only a single tear is initiated in each section between each pair of bordering slits, the ends of all tears will terminate in the longitudinal slits so no tear can run past another to produce a situation (as in FIGS. 1 and 2) conducive to the formation of shards.

Figure 9:
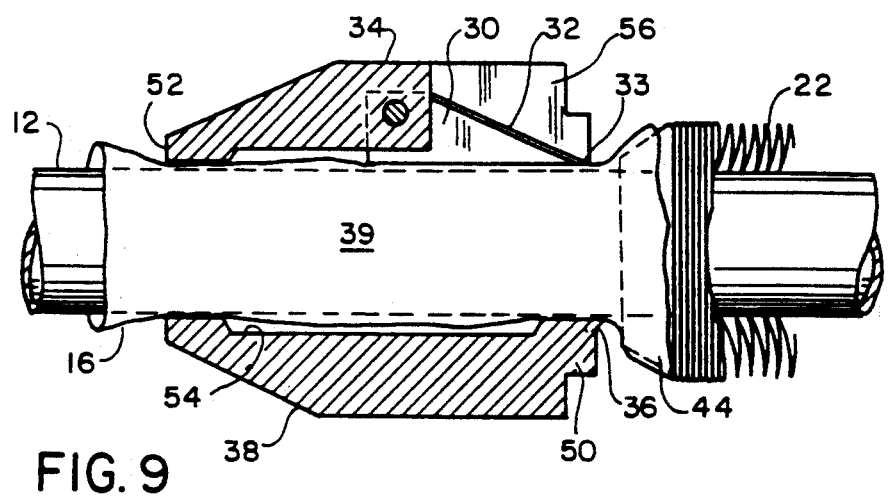
FIG. 9 is a side elevation view partly broken away and in section illustrating on an enlarged scale the position of components just prior to initiating the severing of the casing according to the method of the present invention.
Figure 13:
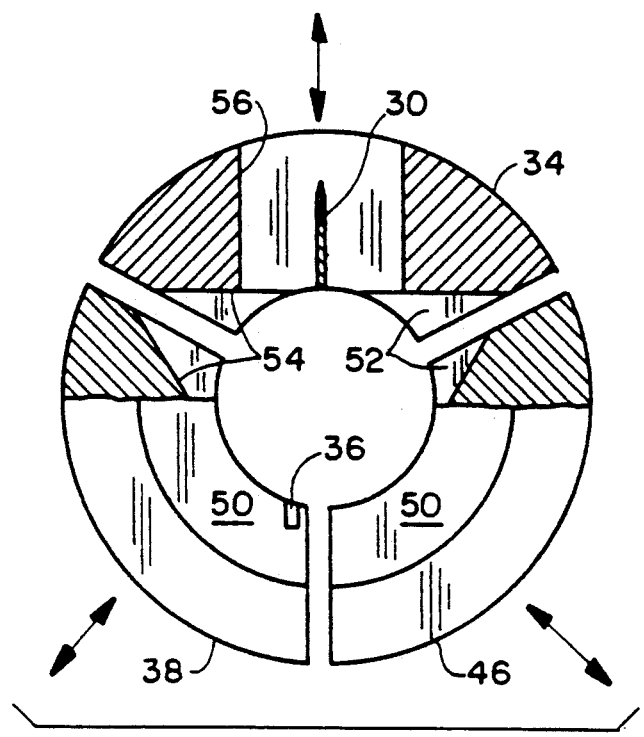
FIG. 13 is a view taken generally along lines 13-13 of FIG. 10 showing the severing means of the present invention incorporated into a three-jawed chuck.
Figure 14:
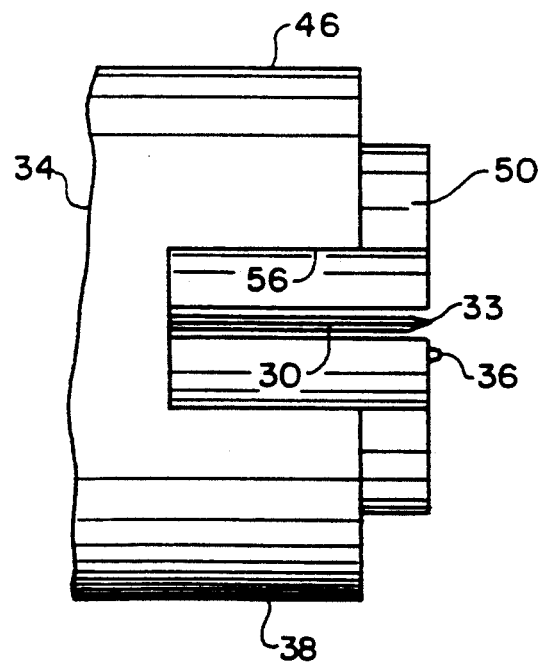
FIG. 14 is a top plan view of a portion of the three-jawed chuck shown in FIG. 13.

FIGS. 13 and 14 illustrate a preferred arrangement wherein three jaw sections 34, 38 and 46 are used. This arrangement facilitates the centering of the severing means about the mandrel. The jaw sections 34, 38 and 46, as noted above, are supported in a fixture (not shown). Conventional means are provided for moving the jaw sections radially within the fixture between an open position spaced away from the mandrel 12 and a closed position as shown in FIGS. 9 and 13 wherein the sections are close about the mandrel. Each jaw section has a collar 50, 52 at its front and rear respectively which form substantially a closed circle about the mandrel when the jaws are in a closed position. In addition, the internal surface 54 of each jaw section is recessed to facilitate the accommodation of the collapsed casing section 39 when the jaws are closed.

As shown in FIGS. 9, 13 and 14, jaw 34 has a longitudinal slot 56 and the knife 30 is centrally located in the slot. The slot provides a clearance space around the knife to permit the casing to ride up, over and around the knife. The knife is the same length, or preferably, shorter than the length of the slot 56 so the knife point 33 does not penetrate the stick end face 44 when the jaw is pushed against the stick.

As shown in FIGS. 13 and 14, pin 36 on jaw 38 is disposed about 180° from the knife and projects slightly beyond the end of the jaw. This insures the pin presses against the stick end face 44 to create a point of localized stress when the jaws 34, 38 and 46 are moved against the end face 44 of the stick. The third jaw 46 is provided to complete the containment about the stick end face 44 when the jaws are in the closed position.

Preferably the jaws should locate the knife point 33 and pin 36 close to the mandrel so as to be positioned as low as possible against the stick end face 44.

Also, it has been found that the angle of knife edge 32 with respect to the surface of mandrel 12 should not be greater than about 25°. A greater angle tends to snag and tear the casing as opposed to cutting a slit. The correct location of knife point 33 and angle of the knife edge 32 may very depending upon the casing size and shirring parameters. For example, it was found that when shirring a size 25 frankfurter casing (which has a recommended stuffed diameter of 22-23 mm) on a 14.6 mm diameter mandrel, the knife point 33 and pin 36 can be located about 0.762 mm from the mandrel surface and the angle of knife edge 32 should be about 20° for proper slitting of the casing. It is well within the skill of the art, given the present disclosure, to determine the correct location of pin 36 relative to the knife and the correct knife angle taking into consideration such factors including, but not limited to, casing diameter, casing wall thickness, water content and shirring parameters such as the mandrel diameter and pleat angle.

In a preliminary test involving size 25 casings as noted above, forty-seven (47) sticks were shirred in accordance with the present invention. The sticks were stuffed to an average diameter of 23 mm and the ends of the stuffed sticks were stripped and examined for shards or other defects. Of the total of ninety-four (94) ends examined (47 sticks), shards were found on only eight (8) ends and of these, only four (4) detached when the casing was stripped. No shards or other defects were found on seventy-four (74) ends. The remaining twelve (12) ends were also shard-free but exhibited a tear either along or at the end of a slit. The average length of the longitudinal slit at each end of the stick was about 18.8 mm. Seven (7) ends exhibited no slit and two ends exhibited slits 10.8 cm and 8.3 cm long respectively. It is believed these excessively long slits were caused by a failure of the pin to initiate a tear so that casing peeled from the end face of the stick and slipped beneath the pin.

Other shirring parameters may influence the correct location of pin 36 relative to knife 30. For example, a pin positioned about 180° from knife 30 should allow a tear to propagate the same distance in opposite directions around the casing to the slit. However, where the shirring procedure involves laying the pleats along a helix (as shown for example in U.S. Pat. No. 2,984,574) it has been found that locating the pin 180° from the knife for some reason causes the tear to propagate farther around the casing in one direction than in the other. The result is that the tail 13 on one of the casing severed ends 11 is longer than the tail on the other. Accordingly, where the shirring technique lays the pleats along a helix it has been found that the pin should be displaced only 150°–160° from the knife and that the direction of the displacement may depend on the direction of the helix. Again, one skilled in the art can easily determine the amount and direction of the displacement, given a particular helical shirring set up, to provide that the tails 13a, 13b on the adjacent severed ends 11a, 11b are substantially equal.

Also, it should be appreciated that modifications can be made without departing from the spirit and scope of the invention as claimed. For example, a cutting means can be arranged to cut a longitudinal slit in the casing before the casing enters the shirring head as for example between the feed rolls 18 and shirring head 14. In this event, the section of casing 39 which is exposed prior to severing will contain the slit so a knife member 30 on jaw 34 can be omitted.

Thus, having described the invention in detail, it should be appreciated that the present invention provides a severing method and apparatus which eliminates the instances of shards on the severed ends of casing.

Having described the invention in detail, what is claimed as new is:

1. A method of severing a stick of shirred casing from a length of feed stock casing joined to said shirred stick comprising the steps of:
   a) cutting a longitudinal slit in said feed stock casing;
   b) stressing said feed stock casing at a point on said feed stock casing which is spaced circumferentially around said feed stock from said slit to create a localized stress concentration sufficient to initiate a tear in said feed stock casing at said point; and
   c) propagating said tear in said feed casing stock casing circumferentially around the casing from said point and into said slit.

2. A method as in claim 1 comprising creating said localized stress concentration at a single point on said feed stock casing and propagating a single tear in opposite directions around the casing from said single point to said slit.

3. A method as in claim 2 comprising propagating said tear about 180° in opposite directions around said feed stock casing from said single point to said slit.

4. A method as in claim 2 comprising initiating said tear at a point which is circumferentially spaced about 150°–180° around said feed stock casing from said slit.

5. A method as in claim 1 including cutting said slit simultaneously with propagating of said tear.

6. A method as in claim 1 wherein propagating said tear occurs by tensioning said feed stock casing.

7. A method as in claim 6 wherein said tensioning occurs by holding said feed stock casing and moving said shirred stick longitudinally away from said held feed stock.

8. A method as in claim 1 wherein cutting said longitudinal slit and propagating said tear occur in said feed stock adjacent the juncture of said feed stock casing to said shirred stick.

9. A method as in claim 1 comprising:
   a) cutting at least two longitudinal slits in said feed stock casing to provide at least two sections;
   b) stressing said feed stock casing at a single point in each section and between each pair of longitudinal slits; and
   c) propagating tears in said feed stock casing from each of said single points and into the two slits which are adjacent each of said points.

10. A method as in claim 1 wherein cutting said slit is accomplished by pressing a knife against said casing feed stock adjacent the juncture of said feed stock and stick and moving said knife point longitudinally in the direction of said stick while holding said feed stock from moving longitudinally such that said knife penetrates said feed stock and said feed stock is drawn along a cutting edge of said knife to cut said slit.

11. A method as in claim 1 wherein stressing said feed stock casing to create said localized stress concentration is accomplished by:
   a) pressing an element against said feed stock casing at a point on said feed stock casing which is at the juncture of said feed stock and stick and which is circumferentially spaced about 150°–180° around said casing from said slit; and then
   b) pressing said element longitudinally against said shirred stick while holding said feed stock casing from moving longitudinally thereby placing said feed stock casing in tension.

12. A method of claim 11 wherein the steps of cutting said slit are performed simultaneously with the pressing of said element longitudinally against said stock.

13. Apparatus for transversely severing a stick of shirred casing from a length of feed stock casing joined to said shirred stick comprising:
   a) means for cutting a longitudinal slit in said feed stock casing;
   b) means for stressing said feed stock casing to create a localized stress concentration at a point on said feed stock casing spaced circumferentially around said feed stock from said slit; and
   c) means for tensioning said feed stock casing to initiate and propagate a tear from said point and circumferentially around said casing and into said slit.

14. Apparatus as in claim 13 wherein said means for cutting a longitudinal slit in said casing is a knife; and a radially movable support for said knife arranged to close said knife against said feed stock with a portion of said knife being located against said feed stock adjacent a last shirred end face of said shirred stick.

15. Apparatus as in claim 14 wherein a cutting edge of said knife is disposed at an angle of no greater than 25° with respect to the longitudinal axis of said stick.

16. Apparatus as in claim 13 including a mandrel for supporting said stick of shirred casing and said knife having a single cutting edge facing in a direction away from said mandrel.

17. Apparatus as in claim 13 wherein said means for stressing said feed stock casing to create said localized stress concentration in said casing is spaced about 150°–180° from said means for cutting a slit in said casing feed stock.

18. Apparatus as in claim 13 including a mandrel for supporting said stick of shirred casing and said cutting means and means for stressing said feed stock casing are each disposed on a radially moveable jaw and said jaws being moveable radially from a position spaced from said mandrel to a position adjacent said mandrel.

* * * * *